United States Patent [19]
Norton

[11] Patent Number: 5,694,718
[45] Date of Patent: Dec. 9, 1997

[54] GLASS CHANNEL FOR WINDOWS

[75] Inventor: Edward W. Norton, Bloomfield, N.Y.

[73] Assignee: Ultra Fab, Inc., Farmington, N.Y.

[21] Appl. No.: 709,083

[22] Filed: Sep. 6, 1996

Related U.S. Application Data

[63] Continuation of Ser. No. 438,671, May 10, 1995, abandoned.

[51] Int. Cl.⁶ ........................................... E05D 15/16
[52] U.S. Cl. ........................................ 49/440; 49/441
[58] Field of Search .......................... 49/440, 441, 408, 49/413, 506; 156/73.1

[56] References Cited

U.S. PATENT DOCUMENTS

| | | | |
|---|---|---|---|
| 1,704,997 | 3/1929 | Atzenhoffer . | |
| 2,242,438 | 5/1941 | Rydquist | 49/440 X |
| 2,594,717 | 4/1952 | Bailey | 49/440 X |
| 2,726,894 | 12/1955 | Bugbee | 296/44.5 |
| 2,821,430 | 1/1958 | Grede | 49/440 |
| 3,068,136 | 12/1962 | Reid | 156/200 |
| 3,131,439 | 5/1964 | Wilfert | 20/52 |
| 3,290,826 | 12/1966 | Weimar | 49/440 |
| 3,807,978 | 4/1974 | Niemanns | 49/441 |
| 3,918,206 | 11/1975 | Dochnahl | 49/441 |
| 4,148,953 | 4/1979 | Horton | 428/85 |
| 4,302,494 | 11/1981 | Horton | 428/95 |
| 4,530,186 | 7/1985 | Guillon | 49/441 |
| 4,788,796 | 12/1988 | Matthews | 49/408 X |
| 5,262,114 | 11/1993 | Boyce et al. | 264/257 |
| 5,265,377 | 11/1993 | Iwasa et al. | 49/441 |
| 5,306,537 | 4/1994 | Gustafson et al. | 49/440 X |
| 5,332,600 | 7/1994 | Iwasa | 427/393.5 |

FOREIGN PATENT DOCUMENTS

| | | |
|---|---|---|
| 630967 | 4/1963 | Belgium . |
| 611166 | 12/1960 | Canada . |

*Primary Examiner*—Kenneth J. Dorner
*Assistant Examiner*—Curtis Cohen
*Attorney, Agent, or Firm*—M. Lukacher; K. Lukacher

[57] ABSTRACT

A glass channel insert to guide, support, and seal a slidable window in a supporting channel window frame. The channel insert includes a centrally disposed durable plastic strip to bear the weight of the window and side sealing or glide members, preferably a laterally disposed pair of opposed pile weatherstrips to seal the inner and outer window surfaces from wind and water. The bearing strip and the weatherstrips are adhered to a common surface of a flexible backing web, preferably by simultaneous ultrasonic welding, providing a substantially planar glass channel element which can be wound as a roll. In installation, the planar element is folded longitudinally to form a U-shaped glass channel insert, which can be sliced transversely at intervals along its back side to permit bending of the insert to follow the curved edges of windows.

26 Claims, 6 Drawing Sheets

GLASS CHANNEL FOR WINDOWS

This is a continuation of application Ser. No. 08/428,671 filed May 10, 1995, now abandoned.

This invention relates to glass channels for windows, more particularly for vehicle windows, and most particularly for vehicle windows which are openable by sliding horizontally.

By glass channel is meant the instrumentalities which define a channel in which a window slides and includes an insert in a member having a channel. The window may have one or more panels and may be in a sash. The term window includes a glass pane or panes with or without a sash.

Openable windows typically are mounted in channels which serve to guide the window element as it slides, and to seal at least the outer surface of the window against entry of wind and water. A typical sliding window channel, also known as a "glass channel" or "glass run", whether the window pane is glass or plastic or other window pane material, has an outer support element, usually a metal member substantially U-shaped in cross-section, and an inner insert formed of plastic, rubber, or cloth and having portions specifically adapted for guiding, sealing, and stopping the window. Inserts are known which are formed by extrusion and by molding and which have flocking or felts or pile or polyurethane as the sealant and as the window stop. U.S. Pat. Nos. 2,726,894; 3,066,136; 3,131,439; 3,290,826; 3,807,978; 5,262,114; and 5,332,600, for example, disclose such glass channels.

In much of the usage of known glass channels, for example, in most automobile doors, the window itself is mounted in an actuating mechanism which bears the weight of the glass as it moves up and down, and the channel is required only to seal and stop the window at the sides and top. There is seldom a requirement that the channel bear the weight of the window, as in a horizontally sliding application.

Many specialty vehicles today, such as recreational vehicles (RV's), pick-up trucks, campers, trailers, and motor homes may be used under adverse weather conditions and at low ambient temperatures, and can be provided with sliding windows containing insulating glass. Such glass, also known as thermopane, consists typically of two, or sometimes three, sheets of tempered plate glass separated and sealed by spacers at the periphery to capture an insulating gas volume therebetween. Windows of this construction are much heavier than conventional single-pane windows and can be several times as thick.

In many such vehicles, these windows are provided as a pair of sealed units, one or both of which are intended to be openable by sliding laterally or horizontally. Thus the weight of the window must be borne by the bottom of the U-shaped glass channel. Known glass channels are not well-suited to bear the greater weight of insulated glass, having typically a felt or pile strip at the bottom of the channel, which strip can become compressed or deformed over time, leading to improper window fit and leakage. Known glass channel inserts generally are not provided with water drainage and therefore windows employing these inserts can easily be rendered inoperable by ice. Known channels are not generally adapted to be bent to follow curved edges of windows, such as are commonly provided in specialty vehicles, while providing a continuous snug fit and seal. Known channels having flock or pile sealants lack a barrier to noise, air, and water. Moreover, flocking can easily wear or tear particularly in icing conditions. Known glass channels can be complex in form and materials, and, therefore, expensive to manufacture.

It is a principal object of the invention to provide an improved glass channel for sliding windows having an incompressible element for bearing the weight of a window.

It is a further object of the invention to provide an improved glass channel having a pile sealant strip containing one or more longitudinal membranes, some membranes for sealing, some for supporting and guiding the window.

It is a still further object of the invention to provide an improved glass channel for use with insulating glass sliding windows.

It is a still further object of the invention to provide an improved glass channel which fits curved window edges having a relatively small radius of curvature.

It is a still further object of the invention to provide an improved glass channel which can be manufactured simply and inexpensively.

It is a still further object of the invention to provide an improved glass channel which can be manufactured in substantially planar form and wound as rolls, but which is easily installed in an outer support element as substantially U-shaped glass channel.

Briefly described, a glass channel in accordance with the invention has a longitudinal flexible backing web attached to a plurality of longitudinal weatherstrip components. Preferably, the width of the flexible webs can be substantially equal to the sum of the heights of the two sides plus the width of the bottom of a U-shaped longitudinal outer support element, which element may have lips or other features for retaining the backing web in the outer element.

Along a central portion of the web, constituting in use the bottom of a substantially U-shaped channel, is disposed a hard strip of a durable material, for example, a hard plastic such as polyamide, polyimide, or polyolefin, and preferably polypropylene. The hard strip component is slightly wider than the thickness of a window to be guided and can bear the weight of a window along the edge of the window without becoming deformed. The hard strip can be relieved along its bearing surface in the form of a longitudinal groove to collect moisture, and the groove can be perforated at intervals to permit collected moisture to drain away.

Outboard of each edge of the hard strip, and spaced apart from it, constituting in use the opposed inner sides of a substantially U-shaped channel, are disposed a pair of sealing components which are adapted to fit snugly against the opposing surfaces of the window near the edges thereof to substantially seal the interior of the channel from ingress of wind and water and to align the window properly with the hard strip. The sealing components can be, for example, strips of flocking, plastic, or pile, preferably strips of polyolefin pile weatherstripping having pile projecting from a polyolefin backing, or base, as disclosed in U.S. Pat. Nos. 4,148,953 and 4,302,494.

The glass channel in accordance with the invention can be manufactured in a continuous assembly machine. A roll of the flexible web, a roll of the central plastic strip, and two rolls of the pile weatherstripping are provided. The components are led over rollers, which may be driven as by an electric motor, through a sealing mechanism, preferably an ultrasonic anvil having channels or cavities in its upper surface adapted to receive the components in their proper orientation and disposition, and thence over additional rollers, which may be driven, to a winder. A cap is disposed along the upper surface of the anvil to retain the components during processing within the anvil. A plurality of openings are provided in the cap over the components, and a plurality of ultrasonic welding tips are brought into contact with the back side of the web opposite the components. More than one tip may be used over each component. Energy from the horns acts to fuse the components to the web. The fused web is drawn out of the anvil and is wound on a mandrel at the winder. Heat and pressure sealing mechanisms which heat and apply pressure to induce bonding of the components may alternatively be used. In a preferred embodiment, the web, strip, and weatherstripping components are all formed from polypropylene.

At the point of installation of the glass channel, the fused flat web is unwound and folded into a transverse U-shape with the hard strip and the pile weatherstripping on the inside of the U to form a glass channel. The longitudinal spaces along the backing web between the hard strip and the weatherstripping define preferred lanes for folding of the flexible strip. In an optional additional step, the folded glass channel, either before or after folding, is sliced transversely from the back side at closely-spaced longitudinal intervals, as by a punch press equipped with a blade, the cuts extending through the base or backing from which the pile projects and may extend partially into hard strip at the bottom of the U. The cuts do not extend through backing where the pile is located. This slicing permits the glass channel to be bent along its longitudinal axis into a curve of short radius, and thus to follow continuously a curved window having an edge radius of curvature as small as 3 inches.

The foregoing and other objects, features, and advantages of the invention, as well as a presently preferred embodiment thereof, will become more apparent from a reading of the following description in connection with the accompanying drawings in which:

Figure 1:
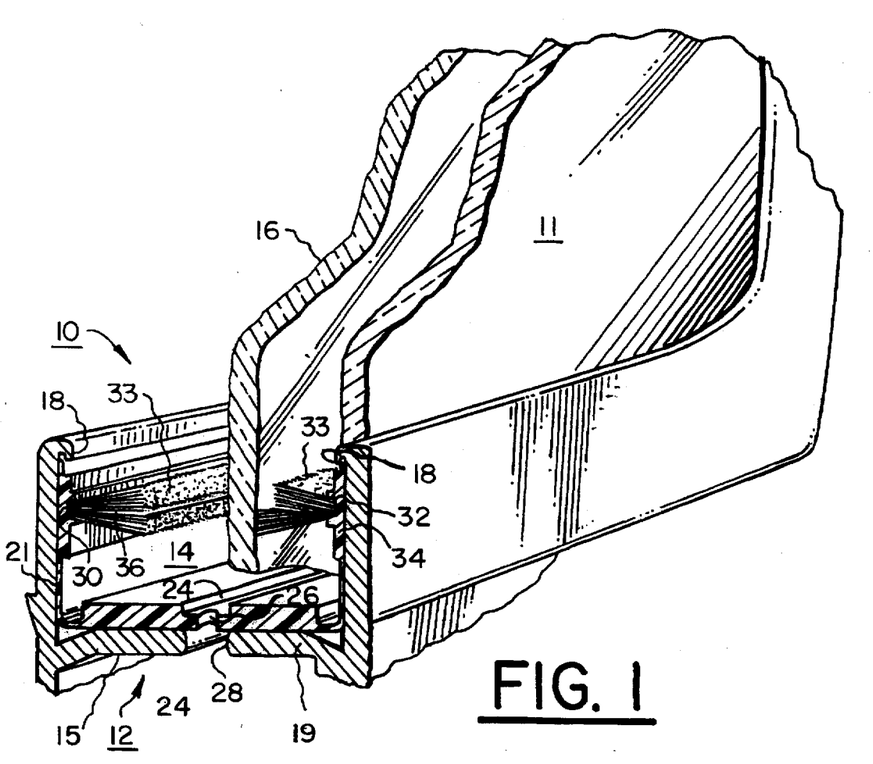
FIG. 1 is a broken away, perspective view of a slidable insulating glass window, glass channel, and outer support element in accordance with the invention.
Figure 2:
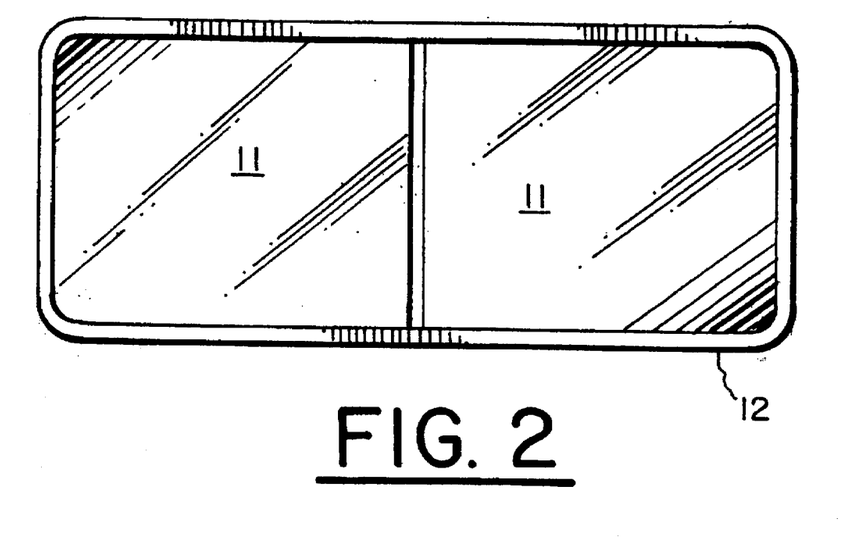
FIG. 2 is an elevational view of a horizontal sliding window and frame, showing rounded corners of the windows being followed accurately by the frame containing glass channel in accordance with the invention.

Referring to FIG. 1, there is shown an assembly 10 having a glass channel 14 in accordance with the invention. Support element 12 may be a complex extrusion, as of aluminum, which is adapted to receive the folded glass channel 14 for supporting, guiding, and sealing a window 11, which is shown as a slidable insulating glass window 16 within a support channel 15 in element 12. Support element 12 has lips 18 for retaining glass channel 14 within element 12. Preferably, channel 14 is sized to fit snugly and to be snap-retained within support channel 15 by lips 18. Element 12 has a gutter 19 and is adapted to be installed in the wall of, for example, a vehicle (not shown). Element 12 is also rounded to follow the rounded corner of window 16 (not visible in FIG. 1). An example of a slidable window 11 having rounded corners which benefit by use of glass channel in accordance with the invention is shown in FIG. 2.

Glass channel 14 has several distinct components joined in a previous assembly step to a backing web 21, as described hereinafter.

Backing web 21 is a flexible strip of material capable of being adhered to the other glass channel components, as by heat sealing or fusing, adhesives, laser welding, or ultrasonic welding. In a preferred embodiment, web 21 is a felted strip of spun polypropylene fibers which have been smoothed on one side 23 as by calendaring or skim coating of polypropylene, the other side 25 being a loose surface of fibers which act desirably as "energy directors" for an ultrasonic welder. A suitable material for web 21 is a polypropylene fiber felt 0.012 inches thick having a polypropylene skim coat 0.002 inches thick on side 23.

Bearing element 22 is a durable strip of material such as plastic, for example, a polyamide, polyimide, polyester, or polyolefin polymer, preferably polypropylene, which strip is readily attachable to backing web 21. Strip 22 bears the weight of window 16 without being deformed, and can do so over long periods of time, thereby maintaining the proper vertical position of window 16 in channel 14. Strip 22 also has a low coefficient of sliding friction against glass, permitting easy opening and closing of window 16 by sliding, and is also known as a "poly-glide" strip. A material suitable for poly-glide strip 22 is a polypropylene copolymer having a Rockwell R hardness of 75 and a density of 0.9 g/cm$^3$. Strip 22 is preferably provided with a central longitudinal groove 24 for collection of moisture (liquid) which could accumulate within assembly 10, and groove 24 is preferably perforated at intervals along its length to provide a plurality of openings 26 through strip 22 and web 21 which mate with openings 28 in support element 12 to permit moisture collected in groove 24 to drain away.

Figure 3:
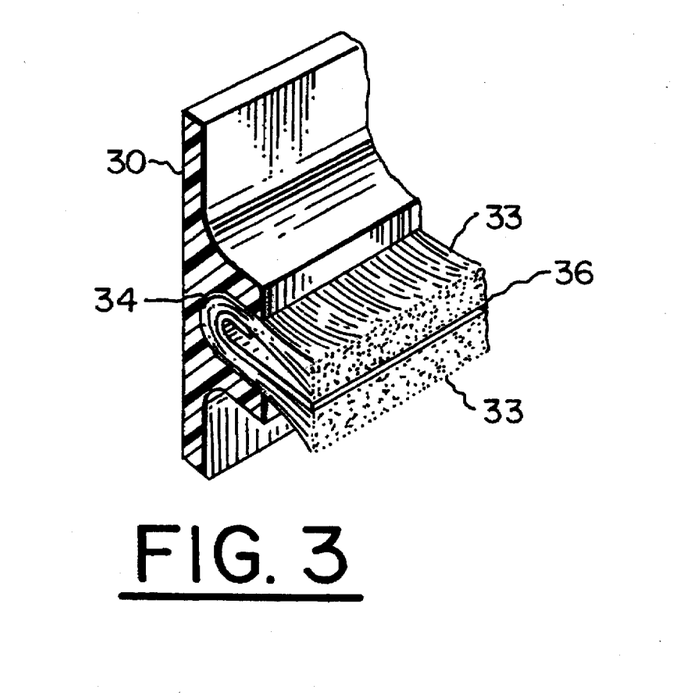
FIG. 3 is a section of pile weatherstripping used preferably in construction of glass channel in accordance with the invention.

Resilient sealants 30 and 32 are longitudinally-extending strips of substantially identical resilient weatherstripping, for example, flocking, felting, and preferably polypropylene pile 33 which has been attached to a polypropylene backing strip 34 in a previous assembly process, preferably substantially as disclosed in U.S. Pat. No. 4,148,953, dated Apr. 10, 1979. A segment of a preferred resilient sealant strip 30 is shown in FIG. 3. Also shown is an integral fin or membrane 36 contained within the pile 33 to retard air infiltration through the pile without increasing the stiffness of the resilient sealants.

Figure 4:
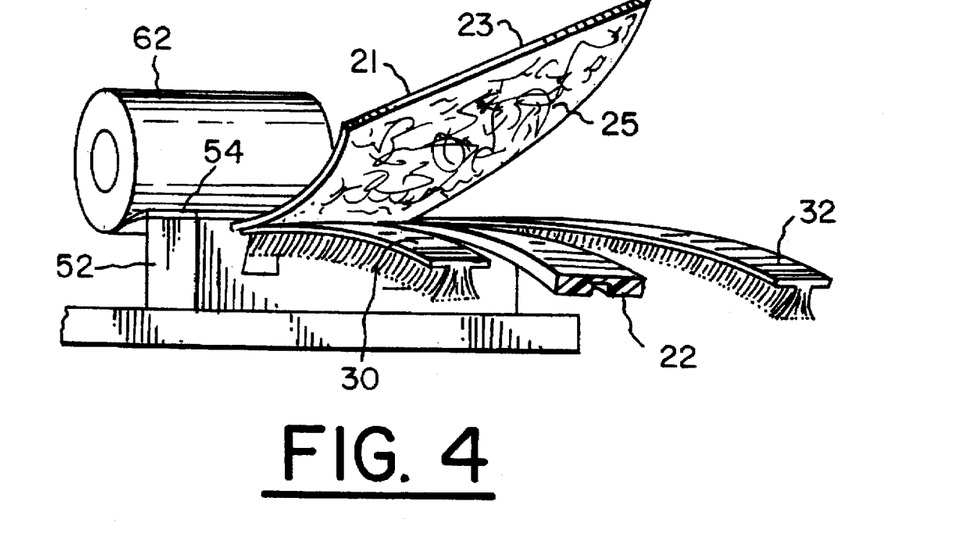
FIG. 4 is an idealized view of components of the subject glass channel being brought together for assembly.

In a preferred method of assembly of glass channel in accordance with the invention, backing web 21, bearing strip 22, and resilient sealant strips 30 and 32 are brought together, as shown schematically in FIG. 4, to form a laminate in which strip 22 is disposed along a central portion of web 21 and strips 30 and 32 are disposed outboard of web 21 along left and right lateral portions of web 21. Web 21 is oriented such that the non-calendared surface 25 is in contact with the components to be adhered.

Figure 9:
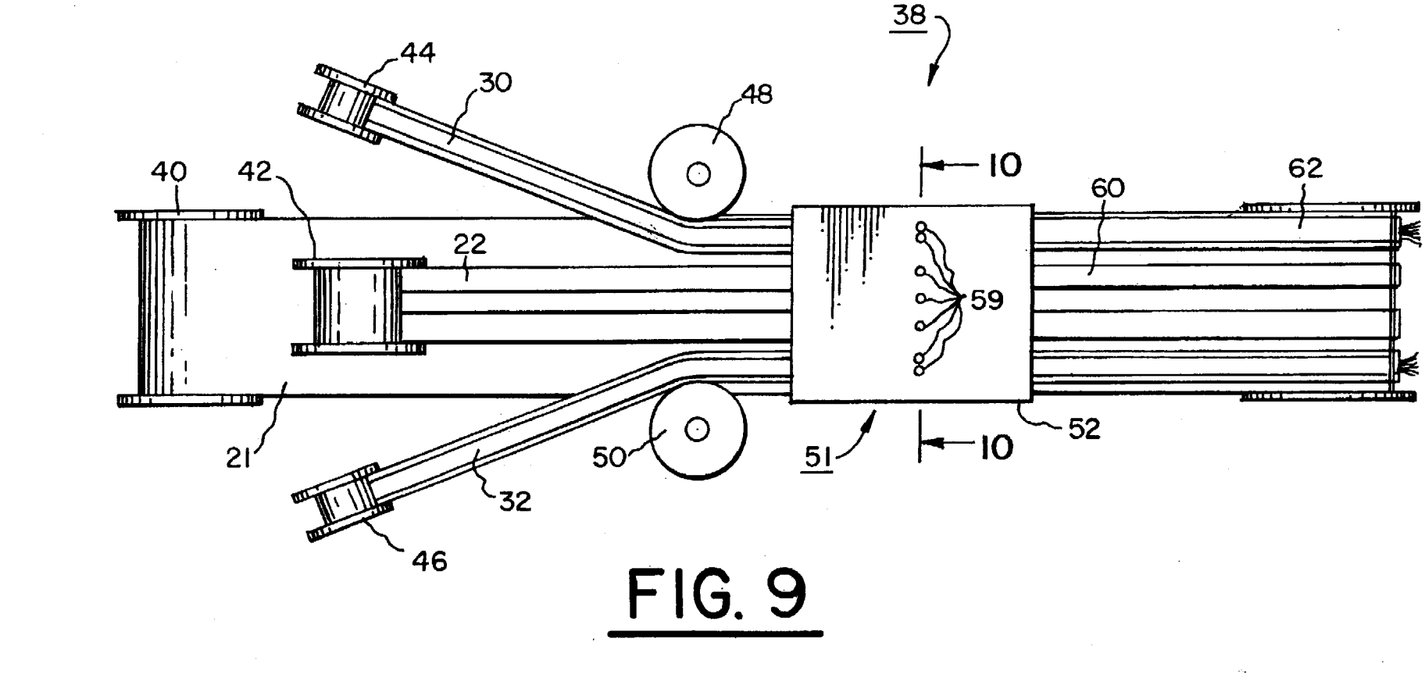
FIG. 9 is a simplified plan view from below of an apparatus for making glass channel in accordance with the invention.
Figure 10:
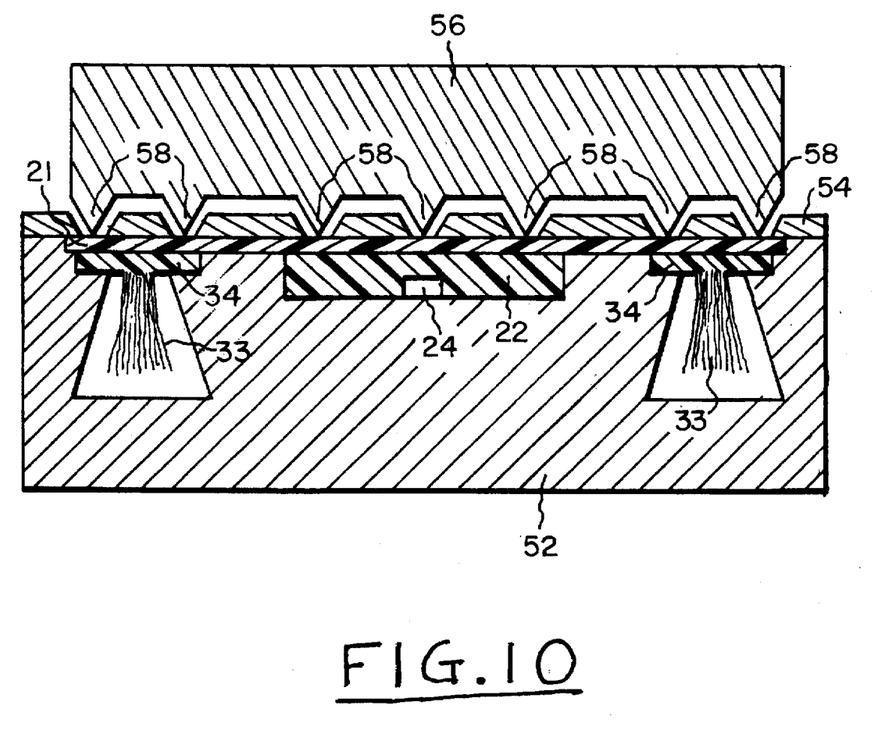
FIG. 10 is a cross-sectional view taken along line 10—10 in FIG. 9.

This relationship is shown schematically in more detail in FIGS. 9 and 10. An ultrasonic assembly apparatus 38 is shown in plan view from below in FIG. 9. A ribbon of backing web 21 is unwound from a supply roll 40 of the web; bearing strip 22 is unwound from a supply roll 42; and resilient sealant strips 30 and 32 are unwound from supply rolls 44 and 46, respectively. Preferably means are provided to align the components, such as, for example, guide rollers 48 and 50. Other conveyance aids such as drive rollers, guides, and turning bars are not shown in FIG. 9 for simplicity but may be used as known in materials conveyance art.

Figure 5:
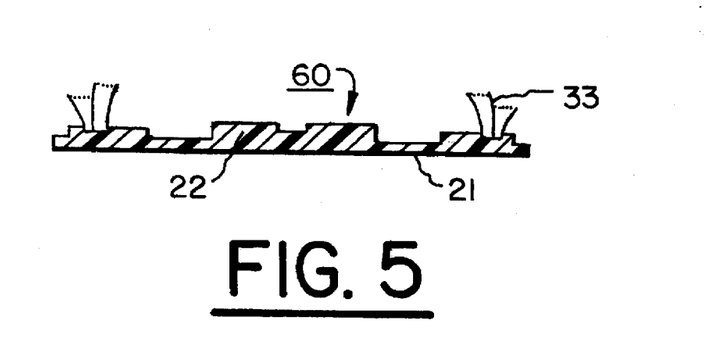
FIG. 5 is a cross-sectional view of a glass channel in accordance with the invention as wound following assembly.

After being properly oriented and aligned, the four components are passed through an ultrasonic welding station 51 comprising an anvil 52 having longitudinal cavities adapted for slidable passage of each component through the anvil. The components are held within anvil 52 by cap 54, which is removably attached to anvil 52 outboard of backing web 21 (means not shown). Cap 54 is provided with a plurality of openings 59 therethrough, giving access to selected widthwise positions on surface 23 of web 21 through cap 54. Ultrasonic horn 56 having a plurality of welding tips 58, preferably seven, is disposed transverse of the web with tips 58 in operative contact with surface 23. Ultrasonic energy is provided to horn 56 and thence to tips 60 by conventional drive means, which energy serves to fuse and weld simultaneously the two sealant strips and the bearing strip to the web backing, providing a unified planar glass channel member 60, shown in cross-section in FIG. 5.

Figure 6:
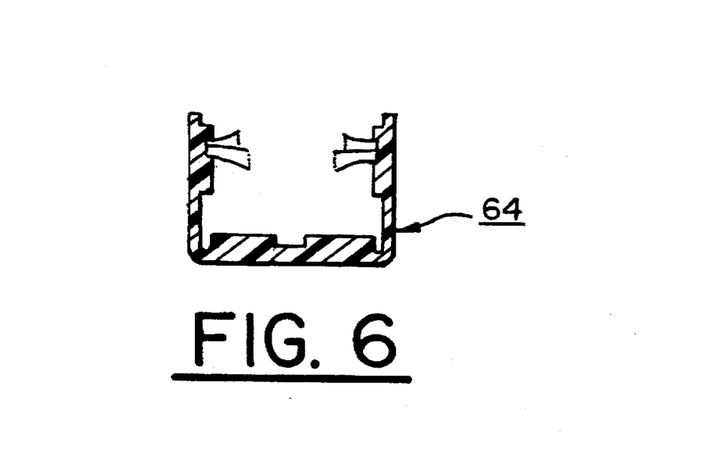
FIG. 6 is a cross-sectional view of the glass channel of FIG. 5 after folding in preparation for installation in support channel as shown in FIG. 1.
Figure 7:
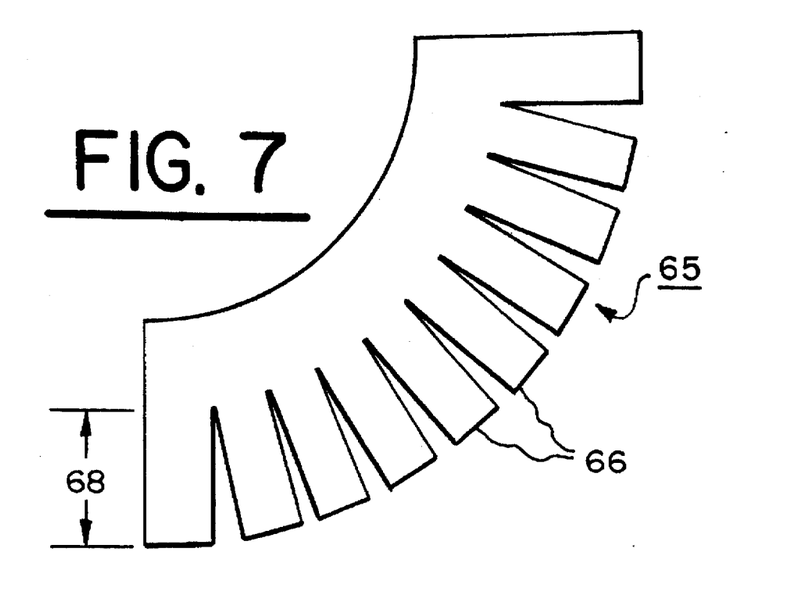
FIG. 7 is a side view of a length of glass channel after being cut to permit bending in accordance with the invention.
Figure 8:
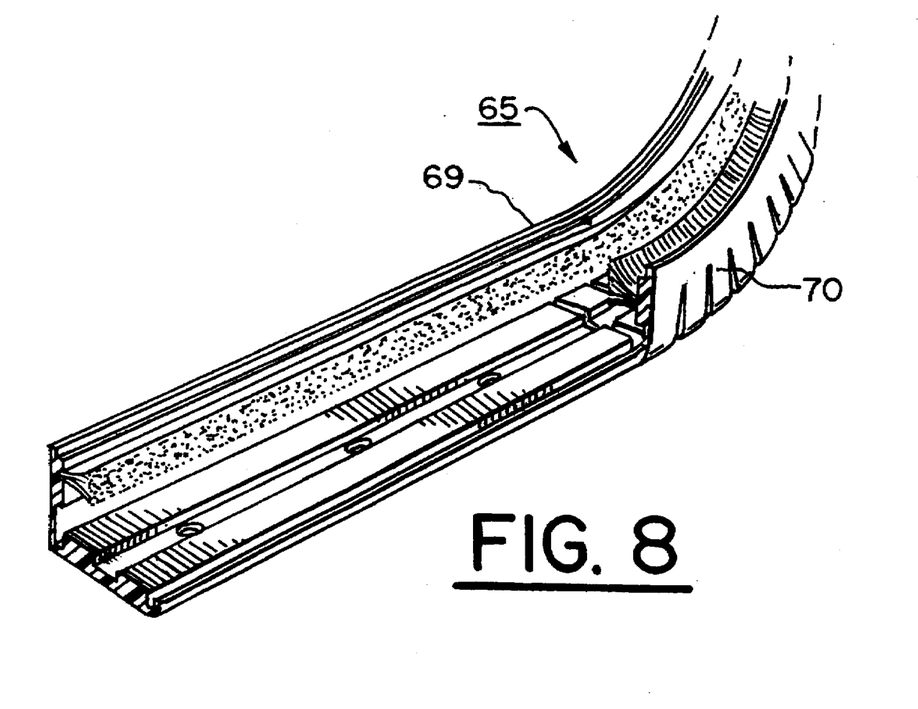
FIG. 8 is a perspective view of glass channel having been cut and bent as shown in FIG. 7.

After welding, planar channel 60 is drawn through welding station 51 by conventional drive means (not shown) and is wound as roll 62. Preferably, planar channel 60 is provided in wound form to installers for further processing. In use, planar channel is folded as shown in FIG. 6 to form a channel structure 64 like channel 14, having a U-shaped cross-section with resilient sealant strips 30 and 32 disposed in apposition. To facilitate bending of structure 64 to follow the curved edges of windows, structure 64 is partially sliced transversely at short intervals, as shown in FIGS. 7 and 8, provide a bendable glass channel structure 65. Preferably, the slicing is performed from the back 66 of structure 64 by a punch press equipped with a blade and set to cut repeatedly to depth 68. Preferably, the set stroke of the blade cuts backing web 21 completely across back 66 and partially along sides 69 and 70. Within the channel, bearing strip 22 is completely severed to provide a longitudinal plurality of bearing elements. Resilient sealant strips 30 and 32 are preferably not severed and their sealing action is therefore unimpaired, while channel structure 65 is thereby adapted to sealingly follow, guide, and support windows having edges with radius of curvature of three inches or less.

From the foregoing description it will be apparent that there has been provided improved glass channel for slidable windows and method for making the channel, wherein single- and double-paned windows can be supported, guided, and sealed. Variations and modifications of the herein described improved glass channel, in accordance with the invention, will undoubtedly suggest themselves to those skilled in this art. Accordingly, the foregoing description should be taken as illustrative and not in a limiting sense.

What is claimed is:

1. Apparatus for guiding, supporting, and sealing a window having an edge adapted for sliding in a substantially U-shaped channel having bottom and side surfaces, said apparatus comprising a foldable longitudinal weatherstrip insertable into said channel and having
   a) a flexible backing strip;
   b) a central portion including a durable bearing element attached to said backing strip and having a smooth working surface matably disposable against said window edge and
   c) a pair of lateral portions including resilient sealants attached to said backing strip and being matably and sealably disposable against opposite surfaces of said window to seal said channel from ingress of air and water.

2. Apparatus in accordance with claim 1 wherein said durable bearing element and said resilient sealants are connected to said flexible backing strip via a bond.

3. Apparatus in accordance with claim 1 wherein said durable bearing element is formed of a solid plastic ribbon approximately the base width of said U-shaped channel.

4. Apparatus in accordance with claim 1 wherein said durable bearing element, said sealants, and said backing strip are formed of ultrasonically bondable material.

5. Apparatus according to claim 4 wherein said material of said element, sealants and strip are the same material which is polypropylene.

6. Apparatus in accordance with claim 2 wherein said bond is selected from the group consisting of adhesion, ultrasonic weldment, heat and pressure bonding and laser welding.

7. Apparatus in accordance with claim 2 wherein said bond is an ultrasonic weldment running longitudinally along said backing strip.

8. Apparatus in accordance with claim 1 wherein said resilient sealants are formed of pile weatherstripping having pile attached to a base and a plastic backing strip common to said base and said element.

9. Apparatus in accordance with claim 8 wherein said pile weatherstripping has at least one longitudinal membrane.

10. Apparatus for guiding, supporting, and sealing a window having an edge adapted for sliding in a substantially U-shaped channel having bottom and side surfaces, said apparatus comprising a foldable longitudinal weatherstrip insertable into said channel and having
    a) flexible backing strip;
    b) a central portion including a durable bearing element attached to said backing strip and having a smooth working surface matably disposable against said window edge, said bearing element being formed of a hard plastic having an inherently low coefficient of sliding friction against glass, said durable bearing element having a longitudinal relief in the working surface thereof; and
    c) a pair of lateral portions including resilient sealants attached to said backing strip and being matably and sealably disposable against opposite surfaces of said window to seal said channel from ingress of air and water.

11. Apparatus in accordance with claim 10 wherein said channel is perforated through said bearing element and said backing strip at intervals along said longitudinal relief.

12. Apparatus in accordance with claim 1 wherein said longitudinal weatherstrip is receivable of a pane or plurality of panes which form said window.

13. Apparatus in accordance with claim 1 further comprising a plurality of transverse cuts through said backing material and said durable bearing element.

14. Apparatus according to claim 1 wherein said bearing element is formed of a hard plastic having an inherently low coefficient of sliding friction against glass.

15. Apparatus according to claim 14 wherein said hard plastic is polypropylene.

16. Apparatus according to claim 14 wherein said smooth working surface is flat.

17. Apparatus is accordance with claim 10 wherein said durable bearing element and said resilient sealants are connected to said flexible backing strip via a bond.

18. Apparatus in accordance with claim 10 wherein said durable bearing element is formed of a solid plastic ribbon approximately the width of said U-shaped channel.

19. Apparatus in accordance with claim 10 wherein said durable bearing element, said sealants, and said backing strip are formed of ultrasonically bondable material.

20. Apparatus in accordance with claim 19 wherein said material of said element, sealant, and backing strip is polypropylene.

21. Apparatus in accordance with claim 17 wherein said bond is selected from the group consisting of adhesion, ultrasonic weldment, heat and pressure bonding and laser welding.

22. Apparatus in accordance with claim 17 wherein said bond is an ultrasonic weldment longitudinally of said backing strip.

23. Apparatus in accordance with claim 10 wherein said resilient sealants are formed of pile weatherstripping having pile attached to a base and a plastic backing strip common to said base and said element.

24. Apparatus in accordance with claim 23 wherein said pile weatherstripping has at least one longitudinal membrane.

25. Apparatus in accordance with claim 10 wherein said longitudinal weatherstrip is receivable of at least one pane to define said window.

26. Apparatus in accordance with claim 10 further comprising a plurality of transverse cuts through said backing material and said durable bearing element.

\* \* \* \* \*